United States Patent
Kido et al.

(10) Patent No.: US 9,294,189 B2
(45) Date of Patent: Mar. 22, 2016

(54) LIGHTING FIXTURE AND VISIBLE-LIGHT-COMMUNICATION SYSTEM WITH SAME

(71) Applicant: Panasonic Corporation, Osaka (JP)

(72) Inventors: Shojirou Kido, Osaka (JP); Eiji Shiohama, Osaka (JP)

(73) Assignee: Panasonic Intellectual Propeerty Management Co., Ltd., Osaka (JP)

(*) Notice: Subject to any disclaimer, the term of this patent is extended or adjusted under 35 U.S.C. 154(b) by 0 days.

(21) Appl. No.: 14/356,485

(22) PCT Filed: Nov. 20, 2012

(86) PCT No.: PCT/JP2012/080048
§ 371 (c)(1),
(2) Date: May 6, 2014

(87) PCT Pub. No.: WO2013/077314
PCT Pub. Date: May 30, 2013

(65) Prior Publication Data
US 2014/0286645 A1    Sep. 25, 2014

(30) Foreign Application Priority Data
Nov. 22, 2011 (JP) ................................ 2011-254930

(51) Int. Cl.
*H05B 37/02* (2006.01)
*H04B 10/116* (2013.01)

(52) U.S. Cl.
CPC .......... *H04B 10/116* (2013.01); *H05B 37/0272* (2013.01)

(58) Field of Classification Search
CPC .......... H05B 33/0815; H05B 33/0818; H05B 33/0809; H05B 37/029; H05B 37/02; H05B 41/3925; H05B 41/391; H05B 41/2828; H05B 33/0803

USPC .................. 315/297, 159, 185 R; 307/25, 104
See application file for complete search history.

(56) References Cited

U.S. PATENT DOCUMENTS

2010/0026208 A1* 2/2010 Shteynberg et al. .......... 315/297
2010/0148679 A1* 6/2010 Chen et al. ................. 315/185 R
(Continued)

FOREIGN PATENT DOCUMENTS

CN    103947137 A    7/2014
JP    2009-005192 A    1/2009
(Continued)

OTHER PUBLICATIONS

International Search Report for corresponding International Application No. PCT/JP2012/080048 mailed Feb. 5, 2013.
(Continued)

*Primary Examiner* — Douglas W Owens
*Assistant Examiner* — Syed M Kaiser
(74) *Attorney, Agent, or Firm* — Renner, Otto, Boisselle & Sklar, LLP

(57) ABSTRACT

A lighting fixture is configured to modulate light intensity of a light source (11) comprising a light-emitting device (2) to superpose a communication signal on illumination light of the light source (11). The fixture includes: a main power supply (3) configured to control light output of the light source (11) based on a dimming signal; a switch device (Q1) for modulating an output current supplied from the main power supply (3) to the light source (11); an impedance element (Rx); a communication circuit (7); and a control power supply (8). The communication circuit (7) is configured to control the switch device (Q1) to superpose a modulation signal on illumination light from the light source (11). The control power supply (8) is configured to supply electric power to the communication circuit (7). One end of two input ends of the control power supply (8) is connected to one end of the impedance element.

20 Claims, 6 Drawing Sheets

(56) References Cited

U.S. PATENT DOCUMENTS

| | | | |
|---|---|---|---|
| 2011/0133655 A1* | 6/2011 | Recker et al. | 315/159 |
| 2012/0038292 A1* | 2/2012 | Kuo et al. | 315/297 |
| 2012/0051757 A1* | 3/2012 | Nishino et al. | 398/201 |
| 2012/0062147 A1* | 3/2012 | Fan | 315/297 |
| 2012/0075891 A1* | 3/2012 | Zhang et al. | 363/21.18 |
| 2012/0175967 A1* | 7/2012 | Dibben et al. | 307/104 |
| 2012/0262961 A1* | 10/2012 | Chien et al. | 363/84 |
| 2013/0015784 A1* | 1/2013 | Kamada et al. | 315/297 |
| 2013/0107585 A1* | 5/2013 | Sims et al. | 363/21.14 |
| 2014/0321860 A1 | 10/2014 | Kido et al. | |

FOREIGN PATENT DOCUMENTS

| | | |
|---|---|---|
| JP | 2009-009817 A | 1/2009 |
| JP | 2010-205440 A | 9/2010 |
| JP | 2010-283616 A | 12/2010 |
| JP | 2011-034713 A | 2/2011 |
| JP | 2012-010269 A | 1/2012 |
| JP | 2012-069505 A | 4/2012 |
| JP | 2012-134691 A | 7/2012 |

OTHER PUBLICATIONS

Form PCT/ISA/237 for corresponding International Application No. PCT/JP2012/080048 dated Feb. 5, 2013.

Office Action for corresponding Chinese Application No. 201280057200.X dated Feb. 13, 2015 and English translation.

\* cited by examiner

FIG. 2
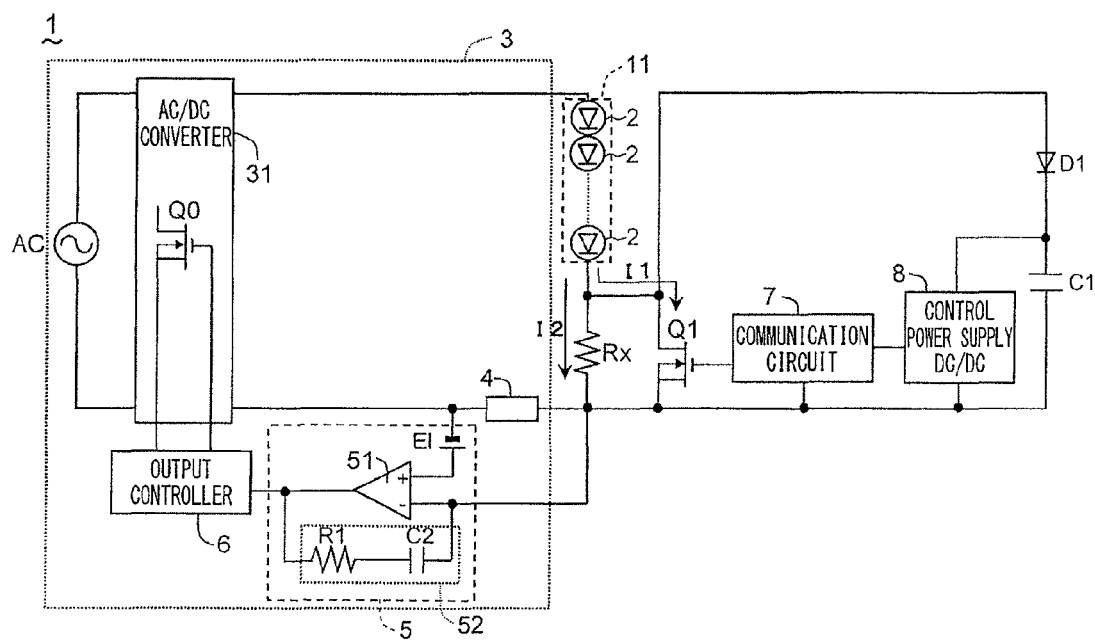
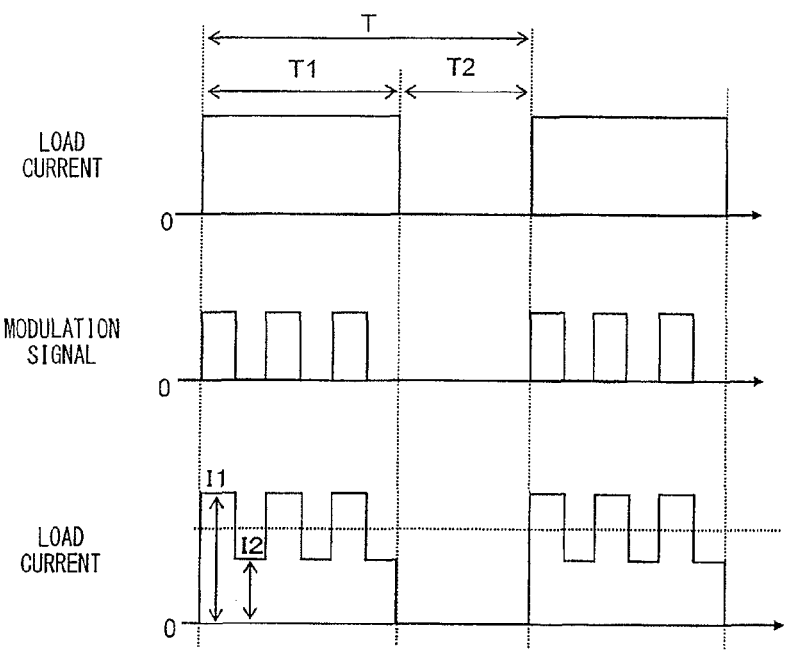
FIG. 3A   LOAD CURRENT
FIG. 3B   MODULATION SIGNAL
FIG. 3C   LOAD CURRENT

LIGHTING FIXTURE AND VISIBLE-LIGHT-COMMUNICATION SYSTEM WITH SAME

TECHNICAL FIELD

The invention relates to a lighting fixture configured to perform a visible light communication by modulating light intensity of a light source to superpose a communication signal on illumination light of the light source, and a visible-light-communication system with the same.

BACKGROUND ART

Japanese Patent Application Publication No. 2011-34713 (hereinafter referred to as a "Document 1") discloses a lighting fixture equipped with a visible-light-communication function that transmits a communication signal by using illumination light. The lighting fixture includes: a light source substrate on which a light source is mounted; a lighting circuit substrate which is electrically connected with the light source substrate and performs lighting control of the light source; and a visible-light-communication controlling substrate which superposes a communication signal on outgoing light from the light source. In the lighting fixture, the visible-light-communication controlling substrate is detachably disposed between the lighting circuit substrate and the light source substrate, and a design thereof can be accordingly made common between a fixture with a visible-light-communication function and a fixture with no visible-light-communication function. Control electrical power of the visible-light-communication controlling substrate is supplied from an output terminal of the lighting circuit substrate.

However, when a switch device for modulation in the visible-light-communication controlling substrate is turned off, a load voltage onto light-emitting devices (LEDs) in the light source is shut off, and accordingly the lighting fixture of Document 1 is put in a condition without substantial load with respect to the light source. If the light source is put in the unloaded condition, a voltage across the output terminal of a power supply unit in the lighting circuit substrate is likely to rise sharply. That is, a PFC circuit having a boost function for improving distortion of an input electric current is used for a general power supply unit of which electric power supply is commercial power AC, and accordingly if the light source is put in the unloaded condition, a voltage across the output terminal of the power supply unit rises close to output voltage of the PFC circuit. If the voltage across the output terminal of the power supply unit rises, an input voltage onto a control power supply of the visible-light-communication controlling substrate rises as well, which causes loss of circuit. In order to suppress the loss of circuit, it is necessary to mount high-priced parts having high pressure resistance or many parts on the power supply unit and the control power supply, which causes high production costs. Mounting the parts also requires a complicated circuit design, and accordingly the lighting circuit becomes bigger, thereby causing difficulty in miniaturizing the lighting fixture.

SUMMARY OF INVENTION

It is an object of the present invention to provide a lighting fixture capable of stabilizing a power supply voltage of a main power supply and an input voltage onto a control power supply, mounting common circuit components on the main power supply and the control power supply, and realizing a brief circuit design, low-cost and miniaturization, and a visible-light-communication system with the same.

The present invention is a lighting fixture configured to perform a visible light communication by modulating light intensity of a light source (11) comprising a light-emitting device (2) to superpose a communication signal on illumination light of the light source (11). The lighting fixture comprises: a main power supply (3) configured to control a load current flowing through the light source (11) based on a dimming signal to control light output of the light source (11); a switch device (Q1) configured to modulate an output current supplied from the main power supply (3) to the light source (11); an impedance element (Rx) connected in parallel with the switch device (Q1); a communication circuit (7) configured to control ON and OFF of the switch device (Q1) to superpose a modulation signal on illumination light output from the light source (11); and a control power supply (8) configured to supply electric power to the communication circuit (7). One end of two input ends of the control power supply (8) is connected to one end of the impedance element.

In an embodiment, the two input ends of the control power supply (8) are connected to two ends of the impedance element (Rx).

In an embodiment, the two input ends of the control power supply (8) are connected to two ends of the light source (11).

In an embodiment, the two input ends of the control power supply (8) are connected to two ends of the main power supply (3).

In an embodiment, the lighting fixture comprises a select switch circuit (9) configured: to select two ends, across which a voltage is the nearest to a power supply voltage of the communication circuit (7), from two ends of the impedance element (Rx), two ends of the light source (11) and two ends of the main power supply (3); and to connect to the input ends of the control power supply (8).

In an embodiment, the switch device (Q1) is a first switch device comprising a MOSFET, and a second switch device (Q2) different from the first switch device (Q1) is provided between the first switch device (Q1) and the impedance element (Rx). Preferably, each of the first and second switch devices (Q1 and Q2) comprises an Nch-MOSFET.

A visible-light-communication system of the present invention comprises: the aforementioned lighting fixture; and a receiver (20) configured to receive a communication signal transmitted from the lighting fixture.

In the present invention, the impedance element (Rx) is connected in parallel with the switch device (Q1), and accordingly when the switch device (Q1) is turned off, the light source (11) is prevented from being put in the unloaded condition, thereby stabilizing a power supply voltage of the main power supply (3) and an input voltage to the control power supply (8). In addition, it is possible to use common circuit components for the main power supply (3) and the control power supply (8), and to realize a brief circuit design, low-cost and miniaturization of the lighting fixture.

BRIEF DESCRIPTION OF DRAWINGS

Preferred embodiments of the invention will now be described in further details. Other features and advantages of the present invention will become better understood with regard to the following detailed description and accompanying drawings where:

FIG. 2 is a circuit diagram of a lighting circuit provided for the lighting fixture;

FIGS. 3A-3C illustrate operating waveforms of a load current of a light source in the lighting fixture and a modulation signal superposed on the load current;

DESCRIPTION OF EMBODIMENTS

Figure 1A:
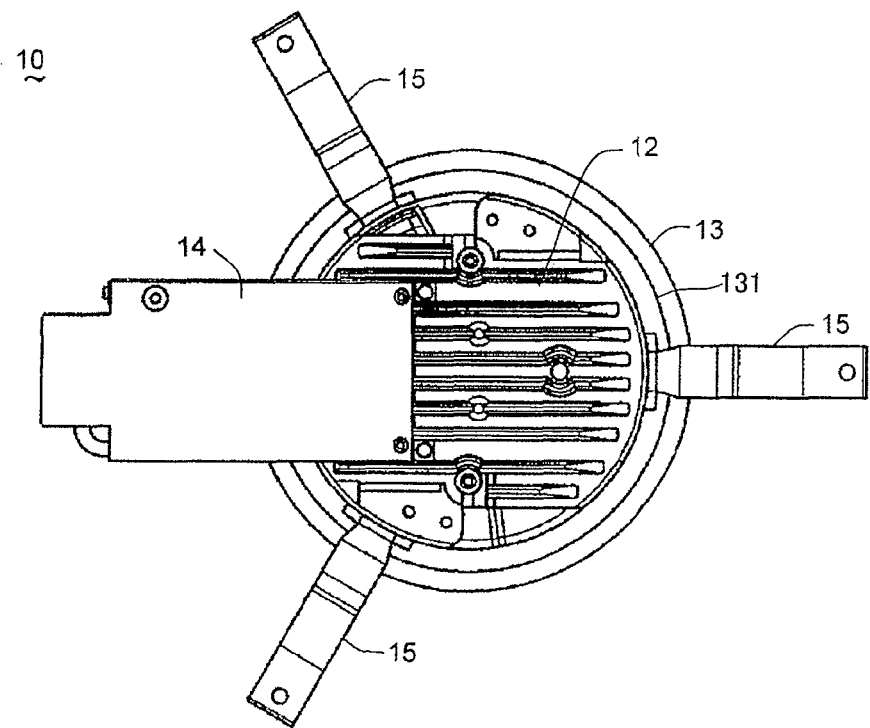
FIGS. 1A, 1B and 1C are a top view, a lateral view and a bottom view of a lighting fixture in accordance with an embodiment of the present invention, respectively.
Figure 1B:
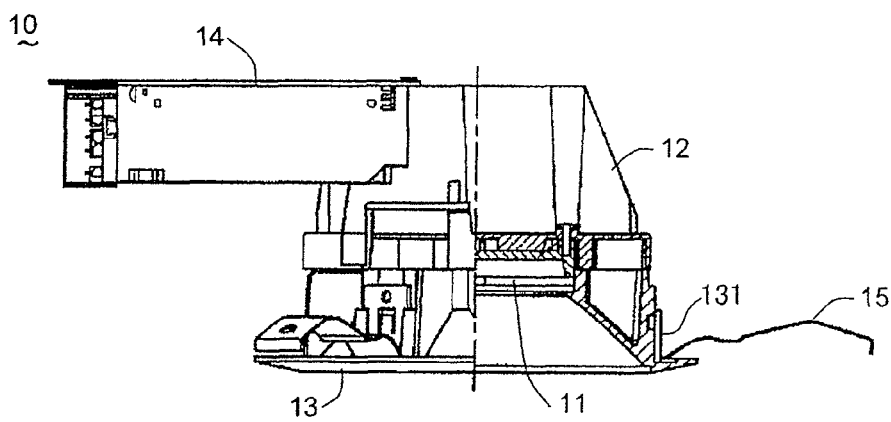
Figure 1C:
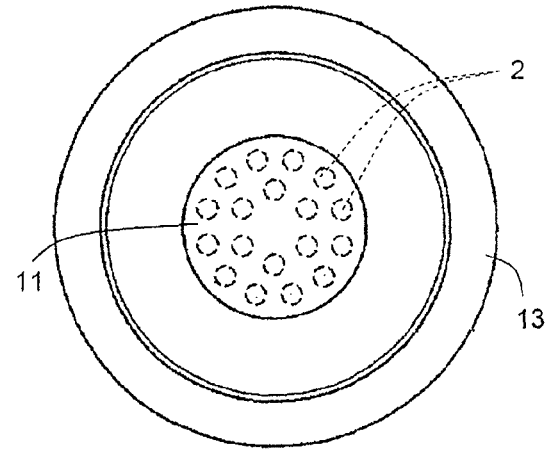

A lighting fixture in accordance with a first embodiment of the present invention is explained with reference to FIGS. 1A to 3C. FIGS. 1A to 1C show a downlight recessed in a ceiling or the like as a configuration example of the lighting fixture 10 in the embodiment. The lighting fixture 10 includes a light source 11, a body 12, a flange frame 13, a terminal block 14 and fixing springs 15. The light source 11 includes light-emitting devices mounted on a circuit board, each of which is, for example, a light-emitting diode (an LED) 2. The body 12 houses a lighting circuit 1 configured to turn on, turn off and dim the LEDs 2 (see FIG. 2 to be described). The flange frame 13 includes a cylindrical portion 131 extended upward from an inner peripheral edge thereof, and is configured to fix the body 12 housing the light source 11 or the like to a ceiling or the like by fitting the cylindrical portion 131 into a hole cut in the ceiling or the like. The terminal block 14 is connected with power wires to receive power supply from a commercial power supply AC. The fixing springs 15 are used for fixing the flange frame 13 to the ceiling or the like.

FIG. 2 shows a circuit configuration of a lighting circuit 1 configured to perform a visible light communication by modulating intensity of the light source 11 to superpose a communication signal on illumination light of the light source 11. The lighting circuit 1 includes a main power supply 3 configured to control a load current flowing through the light source 11 including the LEDs 2 based on a dimming signal to turn on, turn off and dim the light source 11. The main power supply 3 includes: an AC/DC converter 31 configured to convert AC electric power from the commercial power supply into DC electric power; a current sensing resistor 4 connected in series with the light source 11; a constant current circuit 5 configured to amplify a voltage drop in the current sensing resistor 4 to obtain an amplified signal; and an output controller 6 configured to control a load current to the light source 11 based on the amplified signal. In the example of FIG. 2, the light source 11 and an impedance element (Rx) are connected in series with each other, and a series circuit of 11 and Rx is connected in series with the current sensing resistor 4. A combination circuit of 11, Rx and 4 is connected between two output ends of the AC/DC converter 31.

The lighting circuit 1 includes: a resistor (Rx) as the impedance element for modulation, connected in series to the light source 11; and a switch device (Q1) for modulation, for modulating an output current supplied from the main power supply 3 to the light source 11. For example, an nMOSFET (an N-ch MOSFET) is employed as the switch device (Q1). The resistor (Rx) is connected in parallel with the switch device (Q1). The lighting circuit 1 also includes a communication circuit 7 and a control power supply 8. The communication circuit 7 forms a visible-light-communication circuit 7 (a VLC circuit) and is configured to control ON and OFF of the switch device (Q1) to superpose a modulation signal on illumination light output from the light source 11. The control power supply 8 is configured to supply electric power to the communication circuit 7. The visible-light-communication circuit of the communication circuit 7 and the control power supply 8 is formed on a control board different from a circuit board of the main power supply 3 and a circuit board of the light source 11 so that it can be separated from a circuit(s) connected between output ends of the main power supply 3. In short, the impedance element (Rx) and the switch device (Q1) are connected in parallel with each other, and a parallel circuit of Rx and Q1 is connected in series with the light source 11. A combination circuit of Rx, Q1 and 11 is connected between the output ends of the main power supply 3. Specifically, two ends (first and second ends) of the resistor (Rx) are connected to two ends (first and second ends) of the switch device (Q1), respectively, and the first ends of the resistor (Rx) and the switch device (Q1) are connected to a first end of a main power supply 3 through the light source 11, while the second ends of the resistor (Rx) and the switch device (Q1) are connected to a second end of the main power supply 3 (a second end of the current sensing resistor 4). In the example of FIG. 2, the control power supply 8 is a 3-Terminal regulator, and has two input ends (first and second input ends) and two output ends (first and second output ends), and the second input end and the second output end constitute a common terminal.

One end (the common terminal) of the two input ends of the control power supply 8 is connected to one end (the second end) of the resistor (Rx). In the present embodiment, the two input ends of the control power supply 8 are connected to the two ends of the resistor (Rx). Specifically, a diode (D1) for backflow prevention of an electric current is connected between the first end of the resistor (Rx) and the first input end of the control power supply 8, and a smoothing capacitor C1 is connected in parallel with an input part of the control power supply 8. In other words, the first end of the impedance element (Rx) is connected to the first input end of the control power supply 8 through the diode (D1), while the second end of the impedance element (Rx) is (specifically, directly) connected to the second input end of the control power supply 8.

The AC/DC converter 31 is configured to commutate an alternating-current voltage from the commercial power supply (AC) through a rectifier circuit (not shown) and to convert into a direct-current voltage by switching through the switch device (Q0) including, e.g., a MOSFET and smoothing through a smoothing capacitor (not shown).

LEDs employed as the LEDs 2 of the light source 11 are LEDs for emitting illumination light having a specified light color from the lighting fixture 10, for example, white LEDs in each of which a GaN blue LED chip is covered with YAG yellow phosphor so that a white light is emitted by mixing a blue light and an yellow light. However, the LEDs 2 are not limited to the white LEDs. LEDs having different light colors such as red, green and green may be combined arbitrarily.

Alternatively, OLEDs each of which formed of organic light emitting material may be employed as the light source.

The constant current circuit 5 includes: a reference voltage source (E1) of which negative electrode is connected to one end (the first end) of the current sensing resistor 4; an error amplifier 51 of which non-inverting input terminal and inverting input terminal are connected to a positive electrode of the reference voltage source (E1) and other end (the second end) of the current sensing resistor 4, respectively; and a phase compensation circuit 52 disposed between an output terminal and the inverting input terminal of the error amplifier 51. In this configuration, the error amplifier 51 supplies the output controller 6 with an amplified signal in response to a difference between a voltage drop in the current sensing resistor 4 and a power supply voltage of the reference voltage source (E1). The phase compensation circuit 52 is formed of a series circuit of a capacitor (C2) and a resistor (R1) of an integral element, and is configured to adjust a phase of a feedback signal while raising a gain at a low frequency region and also preventing a gain at a high frequency region. For example, on-resistance of a switch device such as a MOSFET in the main power supply 3 or like may be employed as the current sensing resistor 4, and also a configuration for performing constant current control of the light source 11 of the constant current circuit 5 or the like may be incorporated into the main power supply 3.

The output controller 6 is formed of a general purpose microcomputer and the like, and configured to control ON and OFF (switching) of the switch device (Q0) based on an amplified signal from the error amplifier 51 to stabilize a load current through the light source 11. The output controller 6 is also configured to perform PWM control to control light output of the light source 11 by switching the switch device (Q0) of the AC/DC converter 31 based on, for example, a dimming signal Sdim transmitted from an external device (not shown) configured to input dimming operation such as a remote control unit or the like. That is, as shown in FIG. 3A, the output controller 6 is configured to alternately repeat a period (an ON period T1) during which a load current flows through the light source 11 and a period (an OFF period T2) during which a load current does not flow through the light source 11. The output controller 6 is also configured to perform dimming control of the light source 11 by adjusting a ratio (an ON duty ratio) of the ON period (T1) to a period (T) which is a sum of the ON period (T1) and the OFF period (T2) in response to a dimming signal. The PWM control is an example of dimming control mainly during non-communication, and a modulation signal may be superposed on a dimming control signal different from the aforementioned dimming signal shown in FIG. 3A during visible light communication to be described.

The communication circuit 7 is formed of a general purpose microcomputer and the like, and configured: to generate a prescribed modulation signal to be superposed on illumination light by modulating light intensity of the light source 11 in response to a binary information signal transmitted from the outside of the lighting fixture 10 as shown in FIG. 3B; and to supply the modulation signal to a control terminal side of the switch device (Q1). A frequency of the modulation signal is set to at least a frequency higher than a dimming signal so that waveforms are included in one period of the dimming signal. The control power supply 8 includes a DC/DC converter, and is configured to convert a direct-current voltage from the main power supply 3 (a voltage across the resistor (Rx) in the embodiment) into a direct-current voltage having a prescribed voltage value suitable for the communication circuit 7.

In this configuration, the communication circuit 7 is configured: to receive power supply from the control power supply 8; and to perform changeover for connecting and disconnecting the resistor (Rx) to the light source 11 by controlling ON and OFF of the switch device (Q1) based on the prescribed modulation signal. For details, when the switch device (Q1) is turned on, a load current (I1) flows through the light source 11 not via the resistor (Rx). On the other hand, when the switch device (Q1) is turned off, a load current (I2) flows through the light source 11 via the resistor (Rx). Therefore, as shown in FIG. 3C, a current value of the load current (I1) when the switch device (Q1) is turned on is larger than a current value of the load current (I2) when the switch device (Q1) is turned off. Thus, it is possible to modulate light intensity of the light source 11 to superpose a communication signal on illumination light of the light source 11 by changing an amount of a load current flowing through the light source 11.

Even when the switch device (Q1) is turned off, a load voltage from the main power supply 3 to the light source 11 is not shut off owing to the resistor (Rx) connected in parallel with the switch device (Q1). Therefore, the light source 11 is not put in an unloaded condition in the lighting circuit 1, and a power supply voltage of the main power supply 3 also does not rise. The two ends of the resistor (Rx) are connected to sides of the two input ends of the control power supply 8, and accordingly a voltage between the two input ends of the control power supply 8 is suppressed to a voltage determined by an electric current flowing through the light source 11 and the resistor (Rx). For example, when an output voltage of the control power supply 8 is 5 V and an electric current flowing through the light source 11 is 500 mA, an output voltage of the control power supply 8 becomes identical with a voltage across the resistor (Rx) if the resistor (Rx) is 10Ω, thereby reducing a voltage difference to suppress power loss when a communication signal is superposed. It is therefore possible to stabilize a power supply voltage of the main power supply 3 and an input voltage to the control power supply 8 and also to reduce a loss of circuit. In addition, not high-priced parts having high pressure resistance or many parts but inexpensive general-purpose circuit components can be used for the main power supply 3 and the control power supply 8. Moreover, the circuit design is simple, and it is accordingly possible to realize low-cost and miniaturization of the lighting circuit 1 and the lighting fixture 10 with the same.

Examples of the aforementioned embodiment are explained with reference to FIGS. 4 and 5. A lighting circuit 1 in these examples includes a configuration that an electric current from a main power supply 3 flows through resistors (R2 and R3) and a light source 11 which are bifurcated from the main power supply 3 and connected in parallel with each other.

Figure 4:
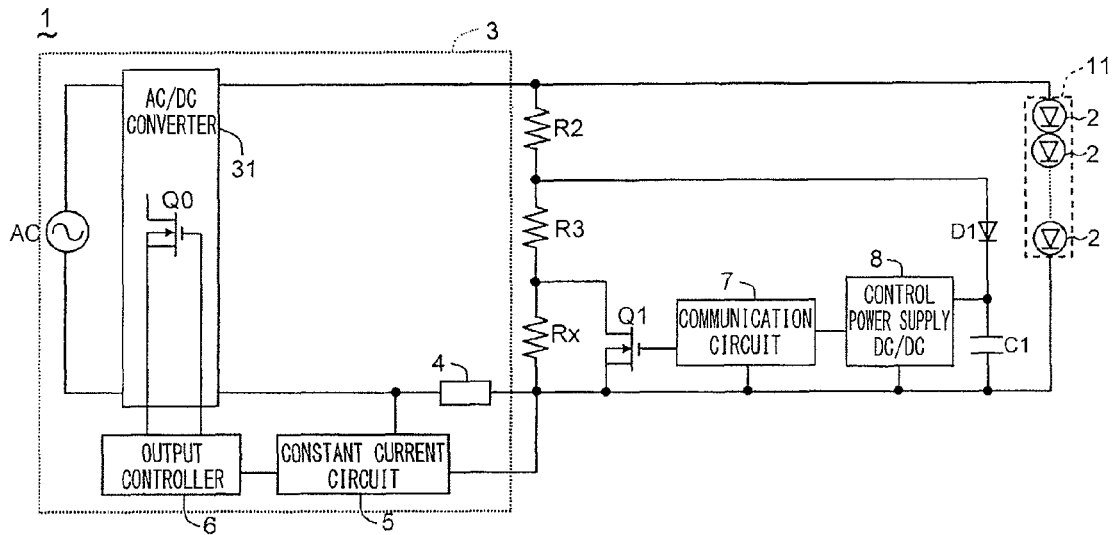
FIG. 4 is a circuit diagram of a lighting circuit in an embodiment.

In the configuration shown in FIG. 4, an impedance element (Rx) and a switch device (Q1) are connected in parallel with each other, and a parallel circuit of Rx and Q1 is connected in series with the resistors (R2 and R3). A combination circuit of Rx, Q1, R2 and R3 is connected between two output ends of a main power supply 3, and also connected in parallel with the light source 11. A series circuit of a diode (D1) and a capacitor (C1) is connected in parallel with the resistors (R3 and Rx), and the capacitor (C1) is connected between two input ends of a control power supply 8. Specifically, two ends (first and second ends) of a resistor (Rx) are connected to two ends (first and second ends) of the switch device (Q1), respectively, and the first ends of the resistor (Rx) and the switch device (Q1) are connected to a first end of the main power supply 3 via the series circuit of the resistors (R2 and R3), while the second ends of the resistor (Rx) and the switch device (Q1) are connected to a second end of the main power supply 3 (a second end of a current sensing resistor 4).

Figure 5:
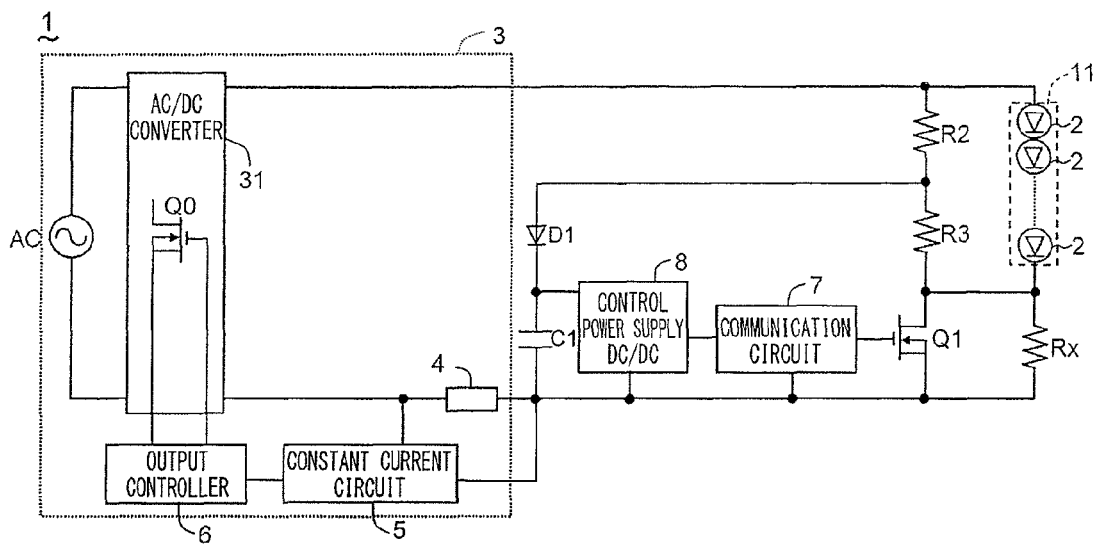
FIG. 5 is a circuit diagram of a lighting circuit in an embodiment.

In the configuration shown in FIG. 5, an impedance element (Rx) and a switch device (Q1) are connected in parallel with each other, and a parallel circuit of Rx and Q1 is connected in series with the light source 11, and also connected in series with the series circuit of the resistors (R2 and R3). A combination circuit of Rx, Q1, 11, R2 and R3 is connected between two output ends of the main power supply 3. A series circuit of a diode (D1) and a capacitor (C1) is connected in parallel with the resistor (R3) and the switch device (Q1), and the capacitor (C1) is connected between two input ends of a control power supply 8. Specifically, two ends (first and second ends) of a resistor (Rx) are connected to two ends (first and second ends) of the switch device (Q1), respectively, and the first ends of the resistor (Rx) and the switch device (Q1) are connected to a first end of the main power supply 3 via the light source 11 and the series circuit of the resistors (R2 and R3), while the second ends of the resistor (Rx) and the switch device (Q1) are connected to a second end of the main power supply 3 (a second end of a current sensing resistor 4).

In short, in the configuration shown in FIG. 4, the resistor (Rx) is connected in series with the series circuit of the resistors (R2 and R3). In the configuration shown in FIG. 5, the resistor (Rx) is connected in series with the light source 11. In both configurations, the switch device (Q1) is connected in series with the series circuit of the resistors (R2 and R3) and connected in parallel with the resistor (Rx). Other configuration is similar to the aforementioned embodiment.

Each of the examples has a resistor (Rx) connected in parallel with a switch device (Q1), and a bifurcation circuit formed of resistors (R2 and R3), and can accordingly avoid the unloaded condition between two output ends of its own main power supply 3 on the lightning circuit 1. Therefore, like the aforementioned embodiment of FIG. 2, even when the switch device (Q1) is turned off, a power supply voltage of the main power supply 3 does not rise. As a result, an advantage similar to the aforementioned embodiment can be obtained. In addition, an electric current from the main power supply 3 also flows through the bifurcation circuit formed of the resistors (R2 and R3), and it is accordingly possible to secure a current path from the main power supply 3 even when the light source 11 is opened. At this time, stress on the switch device (Q1) can be reduced because a voltage applied across the switch device (Q1) is decreased by a load voltage across the resistors (R2 and R3).

Figure 6:
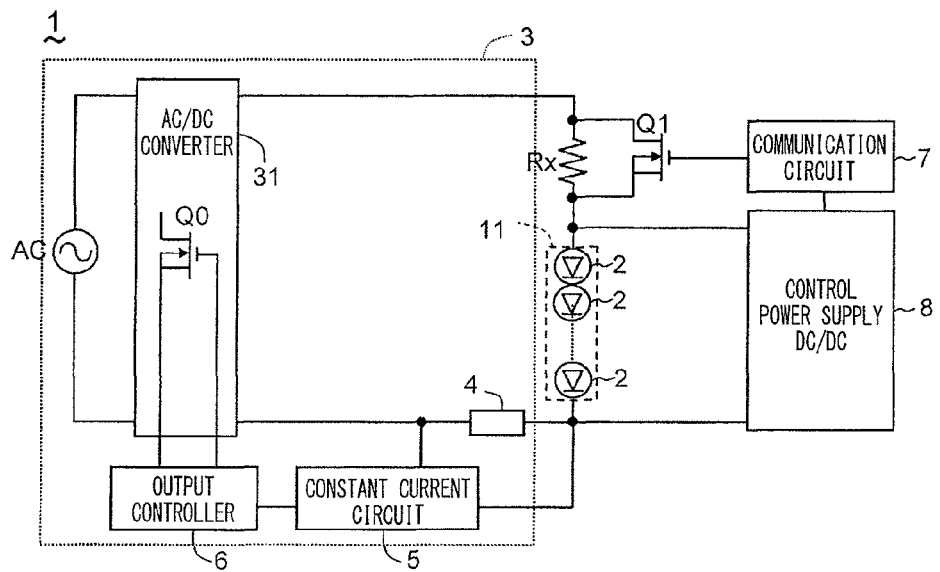
FIG. 6 is a circuit diagram of a lighting circuit in an embodiment.

An example of the aforementioned embodiment is explained with reference to FIG. 6. In a lighting circuit 1 of this example, an impedance element (Rx) and a switch device (Q1) are connected in parallel with each other, and a parallel circuit of Rx and Q1 is connected in series with a light source 11. A combination circuit of Rx, Q1 and the light source 11 is connected between two output ends of a main power supply 3. Specifically, two ends (first and second ends) of the resistor (Rx) are connected to two ends (first and second ends) of the switch device (Q1), respectively, and the first ends of the resistor (Rx) and the switch device (Q1) are connected to a first end of the main power supply 3, while the second ends of the resistor (Rx) and the switch device (Q1) are connected to a second end of the main power supply 3 (a second end of a current sensing resistor 4) through the light source 11. Two input ends (a first input end and a common terminal) of a control power supply 8 for supplying electric power to a communication circuit 7 are connected to two ends of the light source 11. Even when modulation is performed by turning the switch device (Q1) on and off, a current value of a load current to the light source 11 is a binary, and accordingly a mean current supplied from the main power supply 3 formed of a constant current circuit is constant and a mean current through the light source 11 is also constant. Therefore, in the example of FIG. 6, the two input ends of the control power supply 8 are connected to the two ends of the light source 11 through which a constant mean current flows, and thereby a stabilized input voltage can be obtained in the control power supply 8.

Figure 7:
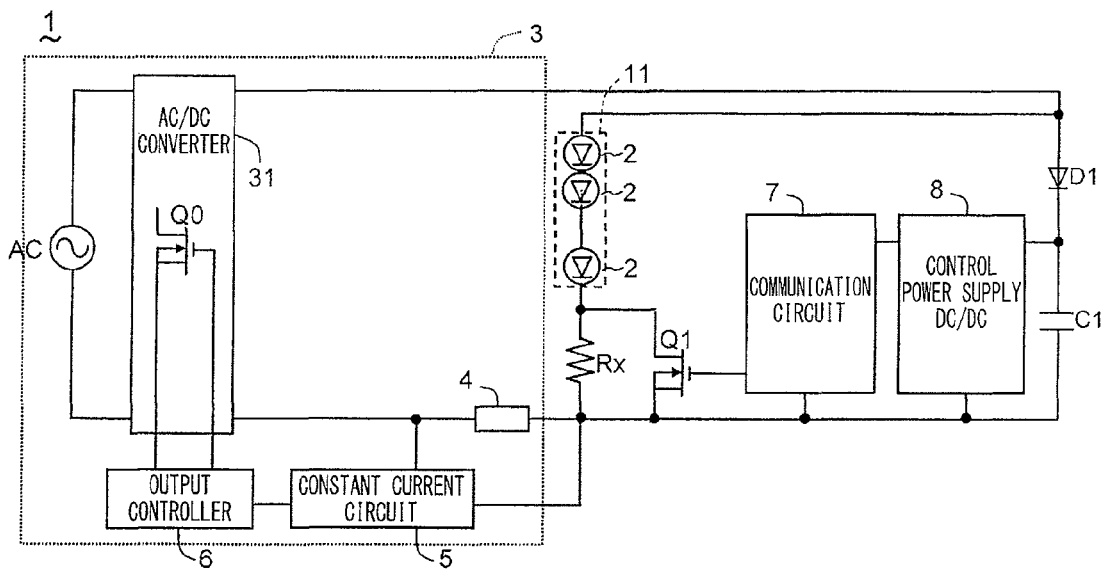
FIG. 7 is a circuit diagram of a lighting circuit in an embodiment.

An example of the embodiment is explained with reference to FIG. 7. In a lighting circuit 1 of this example, an impedance element (Rx) and a switch device (Q1) are connected in parallel with each other, and a parallel circuit of Rx and Q1 is connected in series with a light source 11. A combination circuit of Rx, Q1 and 11 is connected between two output ends of a main power supply 3, and also connected in parallel with a series circuit of a diode (D1) and a capacitor (C1). Specifically, two ends (first and second ends) of the resistor (Rx) are connected to two ends (first and second ends) of a switch device (Q1), respectively, and the first ends of the resistor (Rx) and the switch device (Q1) are connected to a first end of the main power supply 3 through the light source 11, while the second ends of the resistor (Rx) and the switch device (Q1) are connected to a second end of the main power supply 3 (a second end of a current sensing resistor 4). Two input ends of a control power supply 8 for supplying electric power to a communication circuit 7 are connected to the two ends of the main power supply 3. Specifically, a first input end of the control power supply 8 is connected to a first end of the main power supply 3 through the diode (D1), and a second input end of the control power supply 8 is connected to a second end of the main power supply 3. As described in the example of FIG. 6, a mean current supplied from the main power supply 3 formed of a constant current circuit is constant. Therefore, in the configuration of FIG. 7, the two input ends of the control power supply 8 are connected to the two ends of the main power supply 3 for supplying a constant mean current, and thereby a stabilized input voltage can be obtained in the control power supply 8.

Figure 8:
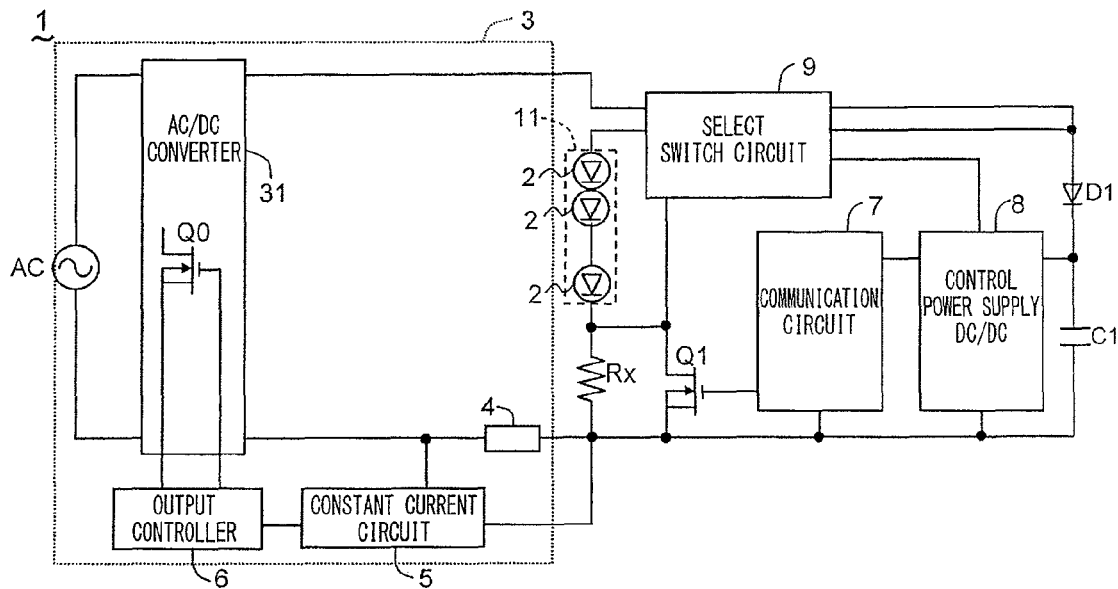
FIG. 8 is a circuit diagram of a lighting circuit in an embodiment.

An example of the embodiment is explained with reference to FIG. 8. A lighting circuit 1 of this example has a select switch circuit 9 as a comparative select circuit in addition to the configuration of e.g., FIG. 2. The select switch circuit 9 is configured: to select two ends, across which a voltage is the nearest to a power supply voltage of a communication circuit 7, from two end of a resistor (Rx), two ends of a light source 11 and two ends of a main power supply 3; and to connect to input ends of a control power supply 8. A voltage across the light source 11 may change according to a temperature and a lighting state of LEDs 2 or the like. A voltage between the two output ends of the main power supply 3 may also change according to failure occurrence within circuits between the two output ends of the main power supply 3. In the configuration of FIG. 8, the input ends of the control power supply 8 are connected to two ends, across which a voltage is the nearest to a power supply voltage of the communication circuit 7, of the two end of the resistor (Rx), the two ends of the light source 11 and the two ends of the main power supply 3, and thereby a stabilized input voltage can be obtained in the control power supply 8.

Figure 9:
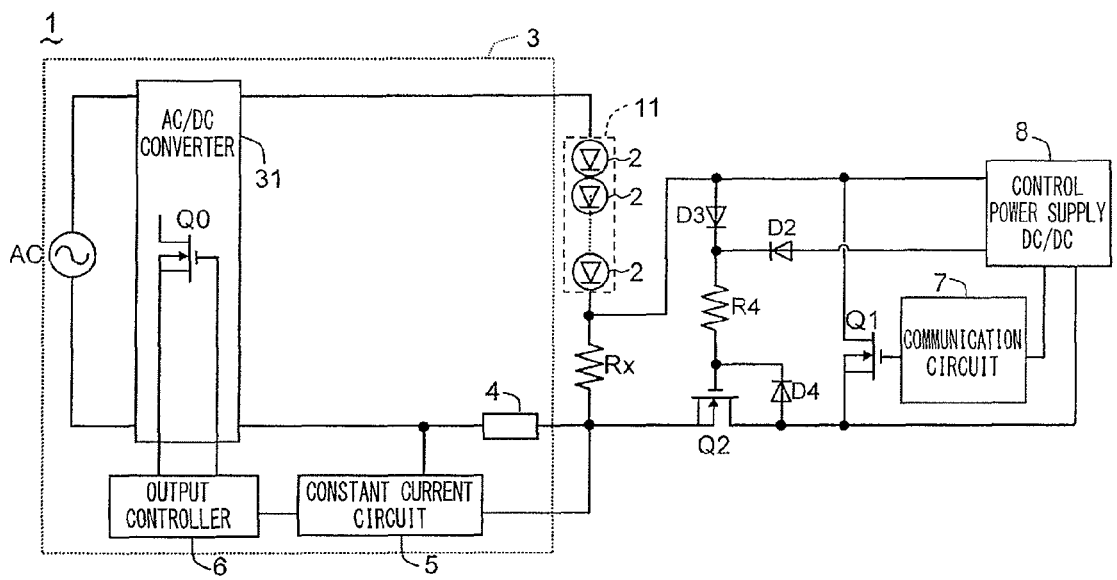
FIG. 9 is a circuit diagram of a lighting circuit in an embodiment.
Figure 10:
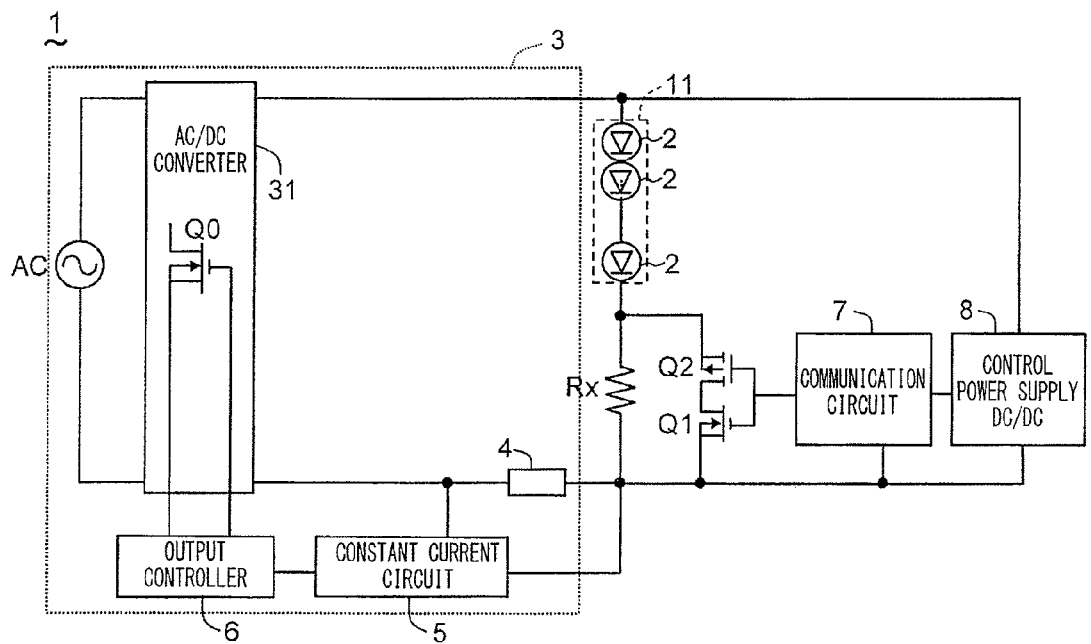
FIG. 10 is a circuit diagram of a lighting circuit in an embodiment.

A lighting fixture in accordance with a second embodiment of the present invention is explained with FIGS. 9 and 10. In a lighting circuit 1 used for the lighting fixture 10 of the present embodiment, a switch device (Q1) is a first switch device formed of an nMOSFET (N-ch MOSFET), and a second switch device (Q2) different from the first switch device (Q1) is provided between the first switch device (Q1) and a resistor (Rx).

As described above, a visible-light-communication circuit of a communication circuit 7 and a control power supply 8 is formed on a control board different from a circuit board of a main power supply 3 and a circuit board of a light source 11 so that it can be separated from a circuit(s) connected between output ends of the main power supply 3. That is, a user can attach, to the lighting fixture 10, the control board for a visible light communication function as an add-on component. However, a user may reversely connect the control board to the circuit board of the main power supply 3 and the circuit board of the light source 11 by mistake. In this reverse connection, since the MOSFET having an internal diode is employed as the switch device (Q1), an electric current flows through the internal diode side but does not flow through the resistor (Rx) side. As a result, a load current corresponding to a dimming ratio (a modulation width) set with the resistor (Rx) does not flow through the light source 11, and a dimming ratio (a modulation width) required for a visible light communication is not obtained.

Therefore, the configuration shown in FIG. 9 is provided with the switch device (Q2) which is formed of an nMOSFET and provided between the switch device (Q1) and the resistor (Rx) in addition to the configuration of FIG. 2. Specifically, two ends (first and second ends) of the switch device (Q2) are connected to a second end of the resistor (Rx) and a second end of the switch device (Q1), respectively. A control terminal (a gate) of the switch device (Q2) is connected to the control power supply 8 through a resistor (R4) and a diode for backflow prevention (D2). A diode for backflow prevention D3 is also connected between the resistor (R4) and the light source 11 (a first end of the resistor (Rx)), and a diode for backflow prevention D4 is connected between the resistor (R4) and a second end of the switch device (Q1) as well. In this configuration, unless the control board for the visible-light-communication function is connected correctly. If a positive voltage is not applied to the gate of the switch device (Q2), the switch (Q1) and the resistor (Rx) are not connected.

In the basic configuration of FIG. 10, the impedance element (Rx) and the switch device (Q1) are connected in parallel with each other, and a parallel circuit of Rx and Q1 is connected in series with the light source 11. A combination circuit of Rx, Q1 and 11 is connected between two output ends of the main power supply 3. Specifically, two ends (first and second ends) of the resistor (Rx) are connected to two ends (first and second ends) of the switch device (Q1), respectively, and the first ends of the resistor (Rx) and the switch device (Q1) are connected to a first end of the main power supply 3 through the light source 11, while the second ends of the resistor (Rx) and the switch device (Q1) are connected to a second end of the main power supply 3 (a second end of a current sensing resistor 4). In this basic configuration, the switch device (Q2) is connected in series with the switch device (Q1), and a series circuit of Q2 and Q1 is connected in parallel with the resistor (Rx). In the example of FIG. 10, the switch device (Q2) formed of a pMOSFET is connected between a drain of the switch device (Q1) and a first end of the resistor (Rx). In this configuration, unless a positive voltage is applied to the gate of the switch device (Q1) and a negative voltage is applied to the gate of the switch device (Q2), the switch device (Q1) is not activated.

That is, in the embodiment, if the control board for the visible-light-communication function is not connected correctly, the switch device (Q1) does not operate substantially, and a communication signal cannot be superposed on illumination light. That is, when a user adds on the control board for the visible-light-communication function to the lighting fixture 10, if no communication signal is transmitted, it can be admitted that the control board is not connected correctly.

Figure 11A:
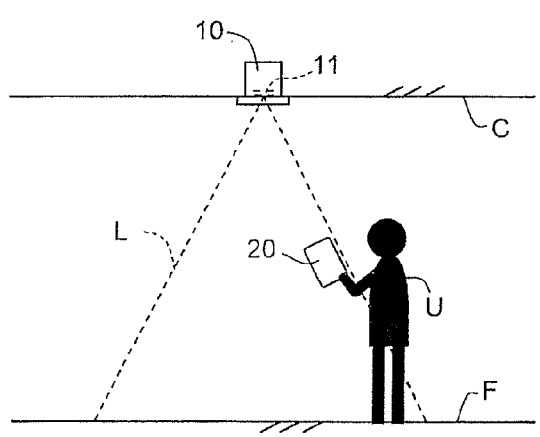
FIG. 11A is a lateral view of a visible-light-communication system in accordance with an embodiment of the present invention and FIG. 11B is a front view of a receiver provided for the system.

A visible-light-communication system in accordance with an embodiment of the invention is explained with reference to FIGS. 11A and 11B. The visible light communication system of the embodiment is formed of: any lighting fixture 10 of the aforementioned embodiments; and a receiver 20 configured to receive a communication signal transmitted from the lighting fixture 10. As shown in FIG. 11A, the lighting fixture 10 is recessed in a ceiling (C), and illumination light (L) is emitted from the light source 11 in a predetermined range in a direction toward a floor (F).

Figure 11B:
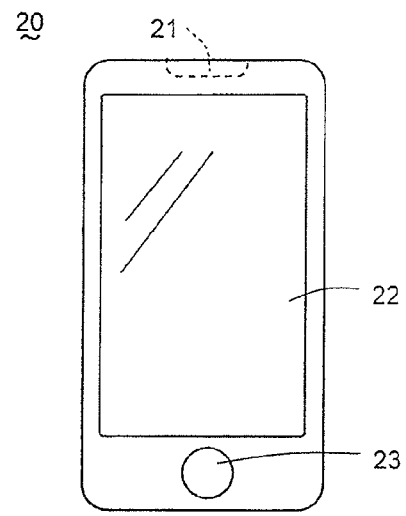

The receiver 20 is formed of, for example, a portable terminal as shown in FIG. 11B and includes a light receive part 21 formed of a photodiode and the like, for receiving the illumination light emitted from the lighting fixture 10. For example, the receiver 20 also includes: a display part 22 formed of a liquid-crystal display or the like; an operation part 23; and a signal processing circuit (not shown) for reading the communication signal based on light intensity of the illumination light (L). If a display having a touch panel function is employed as the display part 22, the function of the operation part 23 can be realized in the display part 22. The light receive part 21 may be a camera formed of a CMOS sensor. That is, a general portable telephone installed with a signal processing software for reading the communication signal may be employed as the receiver 20. However, the receiver 20 is not limited to the aforementioned portable terminals. It may be a receiver having another construction.

In the present configuration, as shown in FIG. 11A, if a user (U) uses the receiver 20, it is possible to receive a communication signal superposed on illumination light from the lighting fixture 10 in the illumination range of the lighting fixture 10. The communication signal includes position information, image information, speech information and the like, and the user (U) can obtain information included in the communication signal by displaying the information on the display part 22 or the like through the receiver 20.

The invention is not limited to the aforementioned embodiments. Various modifications can be applied to the invention. For example, the control power supply 8 may be provided with a backup power supply (not shown) formed of: a secondary battery; and a charging circuit for charging the secondary battery by the output of an AC/DC converter 31. In addition to the resistor (Rx), an LED(s) may be employed as the impedance element. If the LED(s) is lit by, e.g., electric power supplied from the backup power supply, the LED(s) can be made to function as an auxiliary light source when a commercial power supply AC is cut off due to the occurrence of blackout caused by a disaster or the like.

Although the present invention has been described with reference to certain preferred embodiments, numerous modifications and variations can be made by those skilled in the art without departing from the true spirit and scope of this invention, namely claims.

The invention claimed is:

1. A lighting fixture, configured to perform a visible light communication by modulating light intensity of a light source comprising a light-emitting device to superpose a communication signal on illumination light of the light source,
  wherein the lighting fixture comprises:
    a main power supply configured to control a load current flowing through the light source based on a dimming signal to dim the light source;

a switch device configured to modulate an output current supplied from the main power supply to the light source;
an impedance element connected in parallel with the switch device;
a communication circuit configured to control ON and OFF of the switch device to superpose a modulation signal on illumination light output from the light source; and
a control power supply configured to supply electric power to the communication circuit,
wherein one end of two input ends of the control power supply is directly connected to one end of the impedance element.

2. The lighting fixture of claim 1, wherein the two input ends of the control power supply are connected to two ends of the impedance element.

3. The lighting fixture of claim 2,
wherein the switch device is a first switch device comprising a MOSFET,
wherein a second switch device different from the first switch device is provided between the first switch device and the impedance element.

4. A visible-light-communication system, comprising:
the lighting fixture of claim 2; and
a receiver configured to receive a communication signal transmitted from the lighting fixture.

5. A visible-light-communication system, comprising:
the lighting fixture of claim 3; and
a receiver configured to receive a communication signal transmitted from the lighting fixture.

6. The lighting fixture of claim 1, wherein the two input ends of the control power supply are connected to two ends of the light source.

7. The lighting fixture of claim 6,
wherein the switch device is a first switch device comprising a MOSFET,
wherein a second switch device different from the first switch device is provided between the first switch device and the impedance element.

8. A visible-light-communication system, comprising:
the lighting fixture of claim 7; and
a receiver configured to receive a communication signal transmitted from the lighting fixture.

9. A visible-light-communication system, comprising:
the lighting fixture of claim 6; and
a receiver configured to receive a communication signal transmitted from the lighting fixture.

10. The lighting fixture of claim 1, wherein the two input ends of the control power supply are connected to two ends of the main power supply.

11. The lighting fixture of claim 10,
wherein the switch device is a first switch device comprising a MOSFET,
wherein a second switch device different from the first switch device is provided between the first switch device and the impedance element.

12. A visible-light-communication system, comprising:
the lighting fixture of claim 10; and
a receiver configured to receive a communication signal transmitted from the lighting fixture.

13. A visible-light-communication system, comprising:
the lighting fixture of claim 1; and
a receiver configured to receive a communication signal transmitted from the lighting fixture.

14. A lighting fixture, configured to perform a visible light communication by modulating light intensity of a light source comprising a light-emitting device to superpose a communication signal on illumination light of the light source,
wherein the lighting fixture comprises:
a main power supply configured to control a load current flowing through the light source based on a dimming signal to dim the light source;
a switch device configured to modulate an output current supplied from the main power supply to the light source;
an impedance element connected in parallel with the switch device;
a communication circuit configured to control ON and OFF of the switch device to superpose a modulation signal on illumination light output from the light source; and
a control power supply configured to supply electric power to the communication circuit,
wherein one end of two input ends of the control power supply is connected to one end of the impedance element, and
the lighting fixture comprises a select switch circuit configured:
to select two ends, across which a voltage is the nearest to a power supply voltage of the communication circuit, from two ends of the impedance element, two ends of the light source and two ends of the main power supply; and
to connect to the input ends of the control power supply.

15. The lighting fixture of claim 14,
wherein the switch device is a first switch device comprising a MOSFET,
wherein a second switch device different from the first switch device is provided between the first switch device and the impedance element.

16. A visible-light-communication system, comprising:
the lighting fixture of claim 14; and
a receiver configured to receive a communication signal transmitted from the lighting fixture.

17. A lighting fixture, configured to perform a visible light communication by modulating light intensity of a light source comprising a light-emitting device to superpose a communication signal on illumination light of the light source,
wherein the lighting fixture comprises:
a main power supply configured to control a load current flowing through the light source based on a dimming signal to dim the light source;
a switch device configured to modulate an output current supplied from the main power supply to the light source;
an impedance element connected in parallel with the switch device;
a communication circuit configured to control ON and OFF of the switch device to superpose a modulation signal on illumination light output from the light source; and
a control power supply configured to supply electric power to the communication circuit,
wherein one end of two input ends of the control power supply is connected to one end of the impedance element,
wherein the switch device is a first switch device comprising a MOSFET,
wherein a second switch device different from the first switch device is provided between the first switch device and the impedance element.

18. The lighting fixture of claim 17, wherein each of the first and second switch devices comprises an Nch-MOSFET.

19. A visible-light-communication system, comprising:
the lighting fixture of claim 18; and a receiver configured to receive a communication signal transmitted from the lighting fixture.

20. A visible-light-communication system, comprising:

the lighting fixture of claim 17; and a receiver configured to receive a communication signal transmitted from the lighting fixture.

\* \* \* \* \*